(12) United States Patent
Burrows

(10) Patent No.: US 6,895,867 B1
(45) Date of Patent: May 24, 2005

(54) LOW PROFILE DECKING BEAM

(75) Inventor: Ward C. Burrows, Pasadena, CA (US)

(73) Assignee: Ancra International, LLC, Hawthorne, CA (US)

( * ) Notice: Subject to any disclaimer, the term of this patent is extended or adjusted under 35 U.S.C. 154(b) by 0 days.

(21) Appl. No.: 10/458,088

(22) Filed: Jun. 10, 2003

Related U.S. Application Data

(60) Provisional application No. 60/387,732, filed on Jun. 11, 2002.

(51) Int. Cl.[7] ............................................. B61D 17/00
(52) U.S. Cl. ..................................... 105/375; 410/148
(58) Field of Search ................................ 105/375, 370, 105/371; 410/130, 132, 139, 144, 146, 149, 410/89, 143, 148; 211/182, 187; 403/206, 403/315, 316, 330, 327, 388, 244

(56) References Cited

U.S. PATENT DOCUMENTS

| | | | |
|---|---|---|---|
| 2,980,037 A | * | 4/1961 | Elsner ......................... 410/144 |
| 3,114,335 A | * | 12/1963 | Schroeder et al. .......... 410/149 |
| 3,836,174 A | * | 9/1974 | Holman, Jr. ................. 410/149 |
| 3,968,616 A | | 7/1976 | Gostling |
| 4,067,263 A | * | 1/1978 | Naffa et al. .................. 410/144 |
| 4,079,677 A | * | 3/1978 | Vandergriff et al. ........ 410/147 |
| 5,375,534 A | * | 12/1994 | Adams ........................ 105/372 |
| 5,941,667 A | * | 8/1999 | Hardison ..................... 410/146 |
| 6,283,040 B1 | | 9/2001 | Lewin |

\* cited by examiner

*Primary Examiner*—Mark T. Le
(74) *Attorney, Agent, or Firm*—Edward A. Sokolski

(57) ABSTRACT

A beam for supporting a removable second deck for carrying cargo in a vehicle such as a truck trailer is supported between a pair of opposing tracks on opposite sides of the vehicle. The track has slots formed therein to which the beam is attached. The beam has an end foot on each end. Each foot has a keeper pivotally mounted thereon, the keeper being used to removably attach the foot to the slot. The foot has a notch formed in its bottom surface which engages the bottom edge of the slot. The keeper is spring urged against the foot portion to bring the top portions of the keeper and foot into abutment against each other so that the top of the keeper is in abutment against the top edge of the slot, thereby retaining the foot and keeper in the slot. The foot portion and keeper can be withdrawn from the slot by manually moving the keeper away from the foot against the spring tension.

6 Claims, 2 Drawing Sheets

US 6,895,867 B1

LOW PROFILE DECKING BEAM

This application is based on Provisional Application No. 60/387,732 filed Jun. 11, 2002.

BACKGROUND OF THE INVENTION

1. Field of the Invention

This invention relates to decking beams for supporting a removable second deck in a truck trailer and more particularly to such a device which employs keepers for the beams which are less exposed and therefore are less likely to be damaged.

2. Description of the Related Art

Decking beams are utilized generally in truck trailers to support a removable second deck on which relatively lightweight cargo can be transported. The beams are installed in the track and decking material or pallets are laid across the tops of the beams to form the second deck. The tracks generally have rectangular cutouts into which the feet of the beams are installed. The feet of the beams usually have spring loaded keepers which are rotated to lock beam feet into the track cutouts. A prior art device along these lines is described in connection with FIG. 14 of U.S. Pat. No. 6,283,040 issued Sep. 4, 2002 to Lewin.

Such prior art keepers protrude above or below the surface of the deck beam where they are subject to being struck by cargo pallets carried on forklifts, loose objects, or other members. Also, such exposed keepers are subject to being snagged on objects. Consequently such prior art exposed keepers are likely to be bent or otherwise damaged rendering them non-functional. The device of the present invention overcomes this shortcoming of the prior art by utilizing a keeper which is not exposed as are the keepers of the prior art.

SUMMARY OF THE INVENTION

The device of the invention overcomes the shortcomings of the prior art in providing a keeper which effectively protected against exposure to surrounding objects which might cause it damage.

The device of the present invention utilizes a beam with an end foot which has a notch formed on its bottom surface and a flat top surface. A keeper is pivotally mounted on the end foot and is spring urged so that its top under surface is driven in abutment against the flat top surface of the end foot. The keeper has tabs on the sides thereof which can be used to manually pull the top of the keeper away from the top surface of the end foot. A slot is formed in a track to which the end foot of the beam is attached. With the notch on the bottom of the end foot fitted into the slot and with the spring released so that the opposing surfaces of the end foot and keeper are in abutment against each other, the keeper and end foot fit snugly within the slot and are maintained in this position by the spring action. When the keeper is manually retracted, the end foot can be removed from the slot. The keeper and the end foot in their installed positions thus have few exposed portions which are likely to be hit against and damaged.

DETAILED DESCRIPTION OF THE INVENTION

Figure 1:
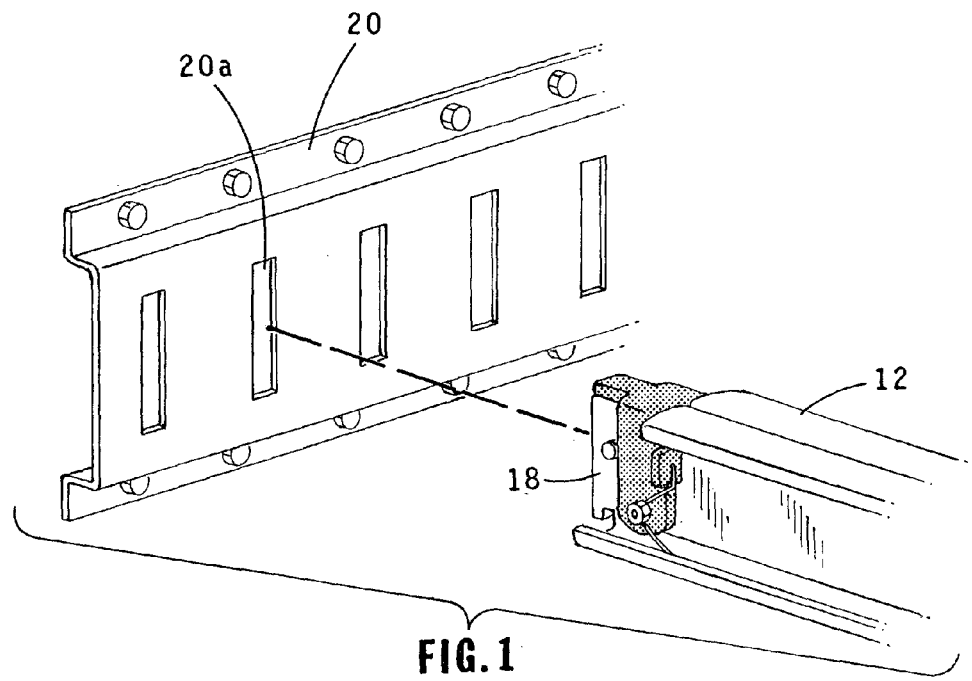
FIG. 1 is a top exploded perspective view of a preferred embodiment of the invention.
Figure 2:
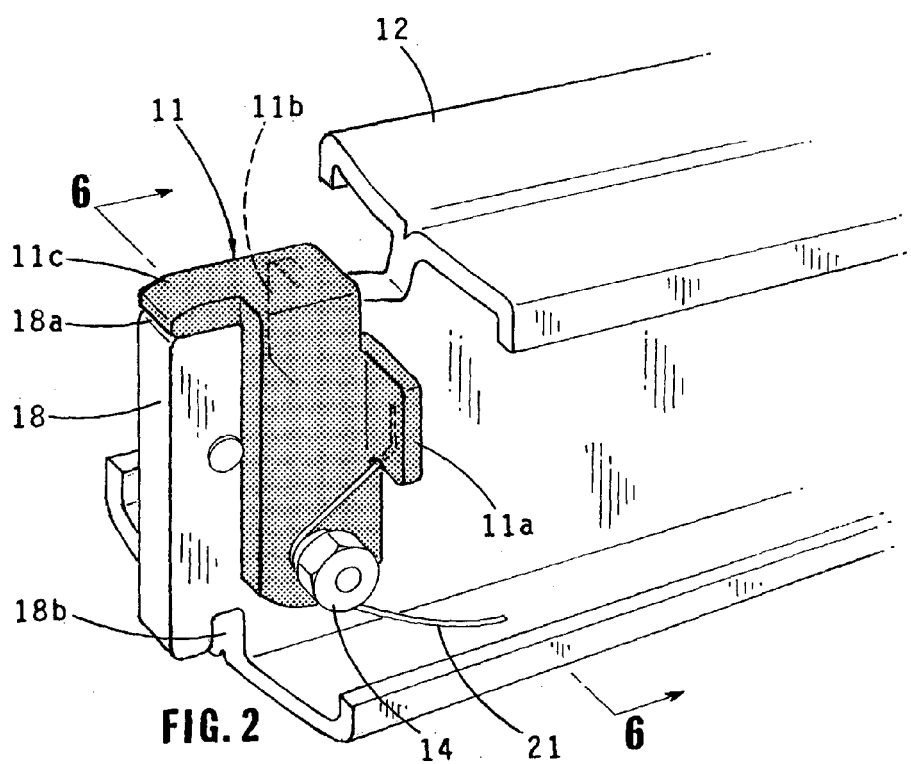
FIG. 2 is top perspective view of the preferred embodiment illustrating the spring actuator for the keeper.
Figure 3:
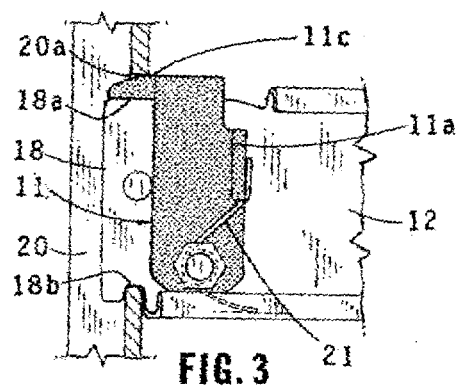
FIG. 3 is a side elevational view of the preferred embodiment showing the keeper in its normal installed position.
Figure 7:
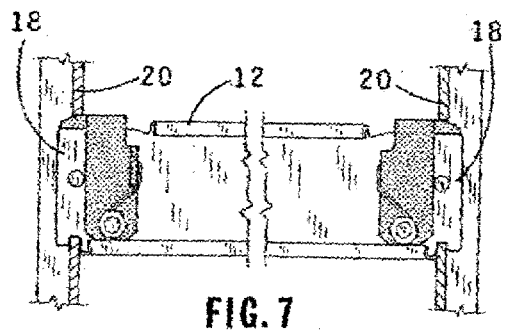
FIG. 7 is a side elevational view showing the installation of a beam between opposing tracks on opposite sides of a compartment by means of the preferred embodiment of the invention

Referring to the FIGS., beam 12 has an end foot portion 18 on each end which has a notch 18b on the bottom and a flat top portion 18a. A keeper 11 is pivotally mounted on each end foot portion 18 by means of bolt 13 and nut 14. In its installed position, the top extension piece 11c of the keeper abuts against the top edge of slot 20a with notch 18b of the end foot portion 18 fitted over the bottom edge of slot 20a as shown in FIGS. 3 and 7.

Each keeper has a pair of tabs 11a and 11b extending from its opposite sides. To install or remove the beam from a slot 20a of track 20, tabs 11a and 11b are manually actuated to bring the keeper to the position shown in FIG. 4. This retracts the top piece 11c of the keeper away from the top surface 18a of the end foot 18. As indicated in FIG. 4, the end foot 18 can then is moved upwardly in slot 20a and notch 18b disengaged from the bottom edge of the slot and the end foot removed from the slot.

Figure 4:
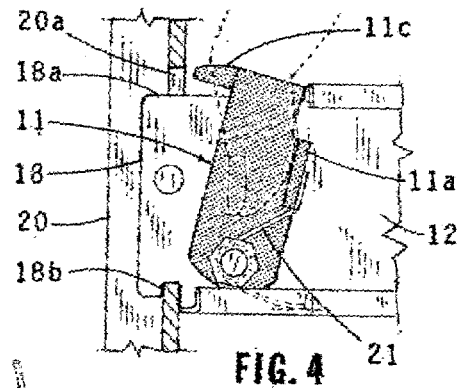
FIG. 4 is a side elevational view of the preferred embodiment showing the keeper in its retracted position for removing and installing the deck beam.
Figure 5:
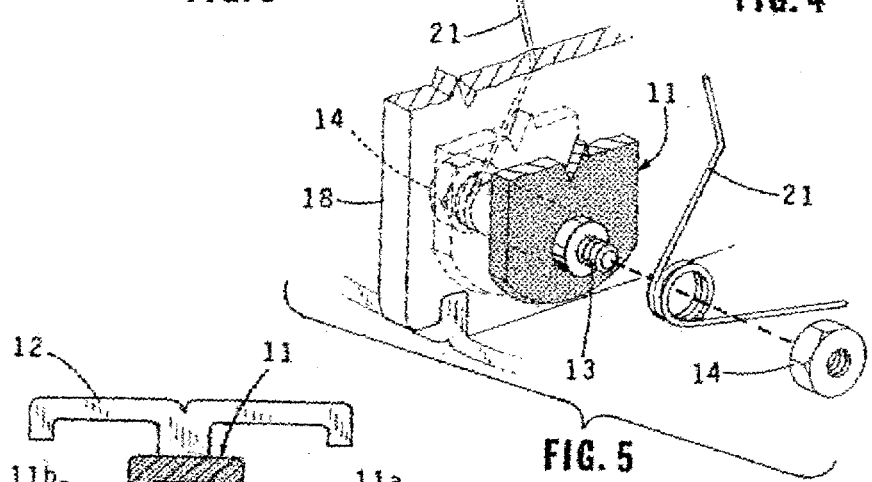
FIG. 5 is a top exploded perspective view of the preferred embodiment showing the spring mechanism for driving the keeper.
Figure 6:
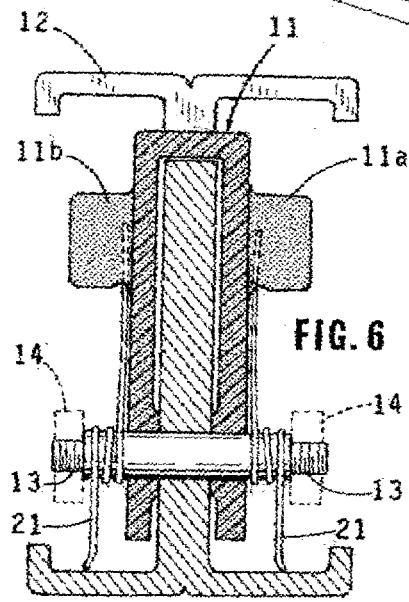
FIG. 6 is a cross-sectional view taken along the plane indicated by 6—6 in FIG. 2.

The end foot can be installed in a slot of the track by first actuating tabs 11a and 11b of the keeper, as shown in FIG. 4 and then inserting the end foot 18 in a slot 20a with notch 18b engaging the bottom edge of the slot. The tabs are then released, permitting the spring to drive the keeper so that the bottom surface of its top piece 11c is in abutment against the top surface 18a of the end foot. In this position, the upper surface of the top piece 11c abuts against the top end of slot 20a, thereby retaining the end foot on each end of the beam and the beam in position for supporting a deck, as shown in FIG. 7.

While the invention has been described and illustrated in detail, it is to be understood that this is by way of illustration and example only and is not to be taken by way of limitation, the spirit and scope of the invention being limited only by the terms of the following claims.

I claim:

1. In a decking system for supporting cargo, said decking system including a deck supported on a beam attached at its opposite ends to a pair of opposing tracks having elongated slots formed therein, a device for removably retaining said beam to said tracks comprising:

an end foot located at each of the opposite ends of said beam, said end feet each being in the form of a flat plate having top and bottom surfaces, a notch being formed in the bottom surface thereof, said top surface being substantially flat;

a keeper pivotally supported on each of said end feet, each of said keepers having an extension piece extending laterally away from the main body thereof, said extension pieces each having a flat lower surface which abuts against the top surface of the associated one of said end feet; and means for resiliently urging each of said keepers to bring each of said top extension pieces into flat abutment against the top surface of the associated end foot;

the top surface of each of said keepers abutting against the top edge of the associated slot and the notch of each of said end feet abutting against the bottom edge of the associated slot, thereby retaining the end feet in said slots.

2. The systems of claim 1 wherein said slots, said end feet and said keepers are oriented vertically.

3. The system of claim 1 wherein said keepers comprise two opposing side plates which are positioned opposite the side walls of the associated end foot.

4. The system of claim 1 wherein said means for resiliently urging said keeper comprises a spring.

5. The system of claim 1 and further including at least one tab extending from said keeper for use in manually positioning said keeper against the tension of the spring means.

6. In a decking system for supporting cargo, said decking system including a deck supported on a beam attached at its opposite ends to a pair of opposing tracks having vertically oriented elongated slots formed therein, a device for removably retaining said bean to said tracks comprising:

an end foot located at each of the opposite ends of said beam, said end feet each being in the form of a vertically oriented flat plate having side and top and bottom surfaces, a notch being formed in the bottom surface thereof, said top surface being substantially flat;

a vertically oriented keeper pivotally supported on each of said end feet, said keepers each having a pair of opposing side plates which are positioned opposite the side surfaces of the associated end foot, said keepers further each having an extension piece extending laterally away from the side plates thereof, said extension piece having flat lower and upper and lower surfaces, said lower surface abutting against the top surface of the associated one of said end feet; and a spring resiliently urging each of said keepers so as to bring each of said top extension pieces into flat abutment against the top surface of the associated end foot;

the top surface of each of said keepers abutting against the top edge of the associated slot and the notch of each of said end feet abutting against the bottom edge of the associated slot, thereby retaining the end feet in said slots.

* * * * *